United States Patent
Bastow

(10) Patent No.: US 7,096,862 B1
(45) Date of Patent: Aug. 29, 2006

(54) SLAB PUSHING ATTACHMENT FOR A STONE SLAB SAW

(76) Inventor: Francis Bastow, 10 Greenwood Rd., Newark Valley, NY (US) 13811

( * ) Notice: Subject to any disclaimer, the term of this patent is extended or adjusted under 35 U.S.C. 154(b) by 0 days.

(21) Appl. No.: 11/184,411

(22) Filed: Jul. 19, 2005

(51) Int. Cl.
*B28D 1/04* (2006.01)

(52) U.S. Cl. .................... 125/13.01; 451/454

(58) Field of Classification Search ............ 125/13.01, 125/35; 451/454, 455, 451
See application file for complete search history.

(56) References Cited

U.S. PATENT DOCUMENTS

| | | | | |
|---|---|---|---|---|
| 3,332,412 A | * | 7/1967 | Clement ...................... 125/14 |
| 3,547,096 A | * | 12/1970 | Ronzani ................... 125/13.01 |
| 4,131,103 A | * | 12/1978 | Ishizuka ................... 125/13.01 |
| 4,223,432 A | * | 9/1980 | Carr ............................ 29/417 |
| 4,326,494 A | * | 4/1982 | Demers ....................... 125/12 |

* cited by examiner

*Primary Examiner*—Robert A. Rose
(74) *Attorney, Agent, or Firm*—Mark Levy & Associates, PLLC; David L. Banner

(57) ABSTRACT

A pusher mechanism for attachment to the carriage, saw guard, or other appropriate point of a rotary-blade stone slab saw. Using either signals from a controller of a modern slab saw or self-generated sensor information, the pusher is actuated at a precise time in the cutting process and applied an outward pressure on the severed slab to ensure that the slab is directed away from the saw blade. While a pneumatic cylinder is typically used, either hydraulic, electro-mechanical, or mechanical mechanisms may also be used to accomplish the push-away function.

18 Claims, 4 Drawing Sheets

SLAB PUSHING ATTACHMENT FOR A STONE SLAB SAW

FIELD OF THE INVENTION

The invention pertains to accessories for rotary stone slabbing saws, and more particularly, to an apparatus to ensure that a sawed slab of stone falls away from a saw blade at the conclusion of the saw cut.

BACKGROUND OF THE INVENTION

The production of finished stone products, for example facing stone, stone tiles, and other thin, flat stone configurations, begins in a quarry where large blocks of stone are separated from the earth using a variety of techniques, some dating back to antiquity. Once quarried, large blocks of stone must be further processed, typically very close to the point where the stone was quarried. This is primarily because of the difficulty in moving large blocks of stone as well as the noise, dirt, and waste produced by the post quarrying processes.

One process typically used to produce thin, flat, stone products is slab sawing. Several different techniques are known and used for slabbing large stone blocks. One is gang sawing wherein a gang of spaced-apart fixed saw blades is mounted in a frame which is reciprocally moved across a stone block. Upon completion of the gang sawing process, parallel slabs of stone are produced. Diamond covered belts or cables may replace the saw blades.

Gang saws have at least two disadvantages. First, the thickness of the stone slabs produced is fixed by the design of the saw frame. Consequently, producing different thickness slabs is problematic. The second disadvantage of a gang saw is speed. Gang saws are significantly slower than rotary blade slabbing saws.

Rotary blade slabbing saws are not unlike radial arm saws well known in the woodworking arts. These saws are typically gantry saws that move on rails over a series of large stone blocks, slabbing each block as required. Having diamond tipped blades as large as 12 feet in diameter, these monster saws cut slice after slice off a stone block. Modern versions of these saws may be computer-controlled and laser guided. A modern, high-tech example of such a saw is the Eagle II traveling bridge diamond saw manufactured by Park Industries of St. Cloud, Minn.

Regardless of how new the technology incorporated, rotary blade slabbing saws have one severe limitation. At the completion of each cutting pass, a severed stone slab remains adjacent the saw blade. If the severed slab topples backward (i.e., towards the saw blade), or perhaps worse, the previously-cut, vertically standing groups of slabs collectively fall backward like dominoes into the blade, the expensive blade is invariably damaged, possibly beyond repair, resulting in lost time and cost. Because the saw blades often cost several thousand dollars each, this is a significant problem. Even if blade damage is avoided, the slabs may subsequently be re-sawed thereby ruining them.

Moreover, slab sawing operations are often performed at night, the day typically being spent in the actual quarrying operations. Once the stone blocks are positioned and the slab saws are set up, slab sawing requires little operator intervention. Except for the aforementioned potential toppling problem, slab saws may therefore run virtually unattended.

Two approaches to the aforementioned problem have heretofore been offered. First, the slab saws may be adjusted to stop their cutting pass slightly short of the end of the slab, thereby avoiding complete severance of the slabs. This leaves the slabs still connected to their adjoining slabs and the problem of a slab tipping into the saw blade is therefore avoided. Unfortunately, at some point in time, the cuts must be completed. This is a tricky operation at best; a slight misalignment of the saw blade compared to the original saw kerf can ruin one or more slabs. This operation is also very labor intensive requiring an expert saw operator to successfully complete each cut.

Another approach to the potential blade damage problem is by keeping a skeleton crew of attendants on duty during slab sawing operations. As the saw nears completion of a cut, the operator stands by and manually exerts force on the nearly severed slab to ensure that it moves away from the blade at the completion of the cut. As previously mentioned, slab sawing operations are typically performed at night near the quarry site. Such sites are remote and are typically the epitome of inhospitality. The large amounts of water used during the sawing and other quarrying operations create a virtual quagmire. The saws are extremely noisy and the sites are rarely well lighted. In addition to the undesirable environment, being in close proximity to the saw blades is dangerous. Quarry operators report dismal records of success with this approach to protecting the saw blades.

It would, therefore, be advantageous to provide an unattended, foolproof, automatic apparatus to ensure that at the completion of the sawing operation, a severed stone slab tilt or fall away from the saw blade.

SUMMARY OF THE INVENTION

In accordance with the present invention, there is provided a pneumatic pusher mechanism for attachment to the carriage, saw guard, or other appropriate point of a rotary-blade stone slabbing saw. Using either signals from the controller of a modern slab saw or self-generated sensor information, the pusher is actuated at a precise time in the cutting process and applies an outward pressure on the severed slab to ensure that the slab is directed away from the saw blade. While a pneumatic cylinder is preferably used, hydraulic, electro-mechanical, or mechanical mechanisms may also be used to accomplish the push-away function.

It is, therefore, an object of the invention to provide an automatically-actuated pushing mechanism for attachment to the carriage or saw guard of a rotary-blade stone slab saw.

It is another object of the invention to provide an automatically actuated pushing mechanism utilizing a pneumatic cylinder.

It is a further object of the invention to use control signals from a slab saw's control system to actuate the pusher mechanism.

It is an additional object of the invention to provide an automatically actuated pushing mechanism having independent, adjustable sensors and a dedicated controller to actuate the pusher mechanism when appropriate signals and control information are not available from a slab saw's controller.

BRIEF DESCRIPTION OF THE DRAWINGS

A complete understanding of the present invention may be obtained by reference to the accompanying drawings, when considered in conjunction with the subsequent detailed description, in which:

FIG. 3 is a front elevational, schematic view of the and

DETAILED DESCRIPTION OF THE PREFERRED EMBODIMENT

The present invention provides a pneumatically-operated pusher disposed at the trailing edge of a rotary, stone slabbing saw to prevent one or more previously sawn stone slabs from toppling backward into the saw blade.

Figure 1:
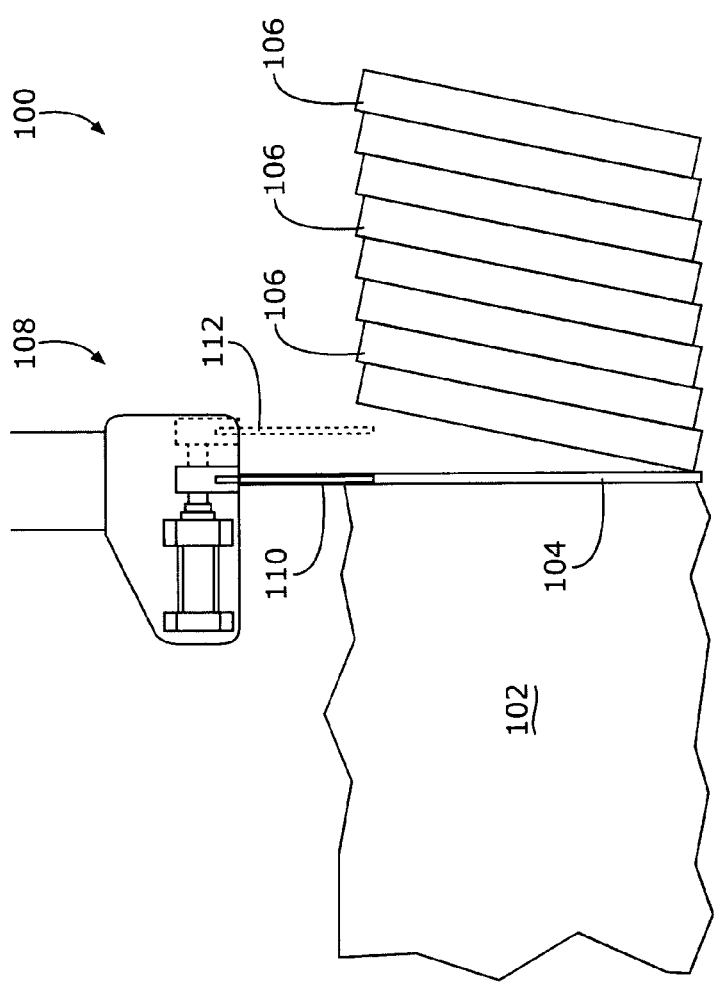
FIG. 1 is a front, elevational schematic view of a stone block being sawn into slabs with the previously-sawn slabs properly falling away from the saw blade.

Referring first to FIG. 1, there is provided a front elevational, schematic view 100 of a stone block 102 being sawed into slabs 106. An unsawn portion of stone block 102 is shown adjacent a saw blade 104. Several stone slabs 106 have been sawed from stone block 102. As shown in FIG. 1, sawn stone slabs 106 have fallen harmlessly away from saw blade, pushed in that direction by the extension of stone-contacting pusher member 110 to an extended position as shown at reference number 112. Without the intervention of stone-contacting pusher member 110, instead of toppling as shown in FIG. 1, one or more of stone slabs 106 could have fallen backwards towards saw blade 104. This condition generally damages saw blade 104 or exposes stone slabs 106 to an additional, erroneous cutting operation that typically ruins stone slabs 106.

Figure 2:
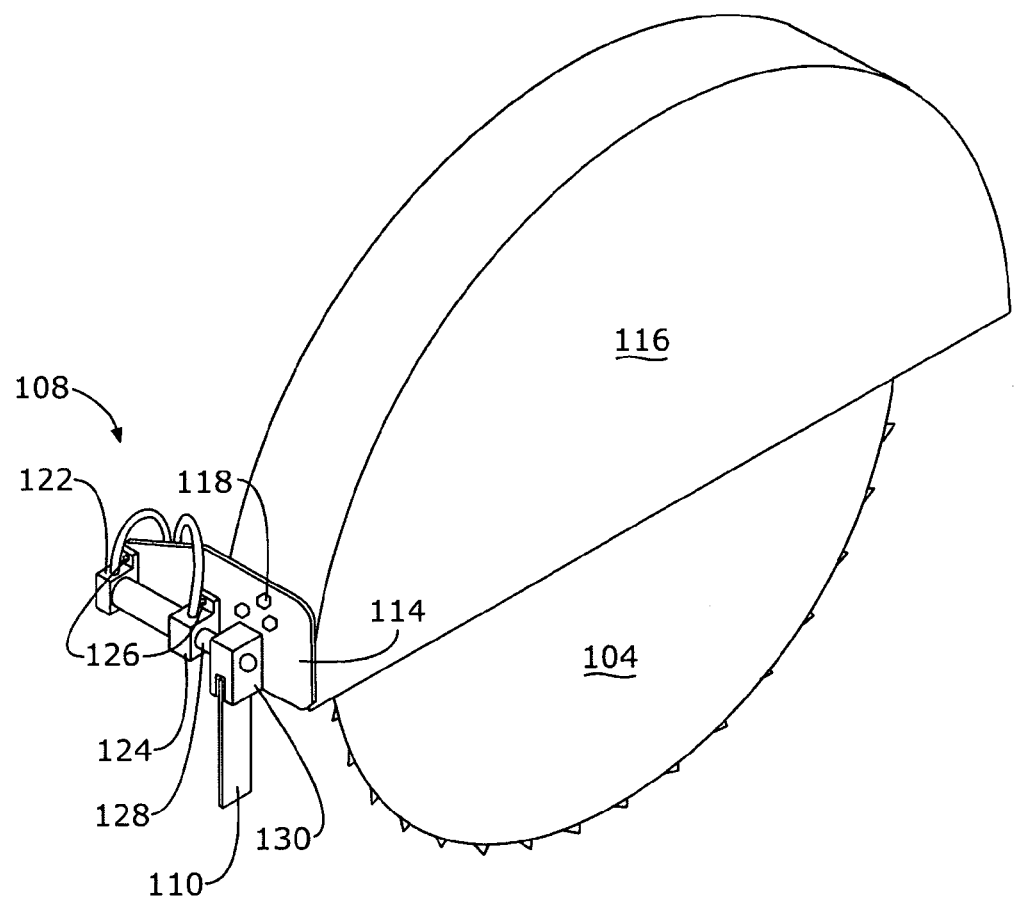
FIG. 2 is a perspective, environmental view of the pusher of the invention in a withdrawn, non-operating position in its intended operating environment.
Figure 3:
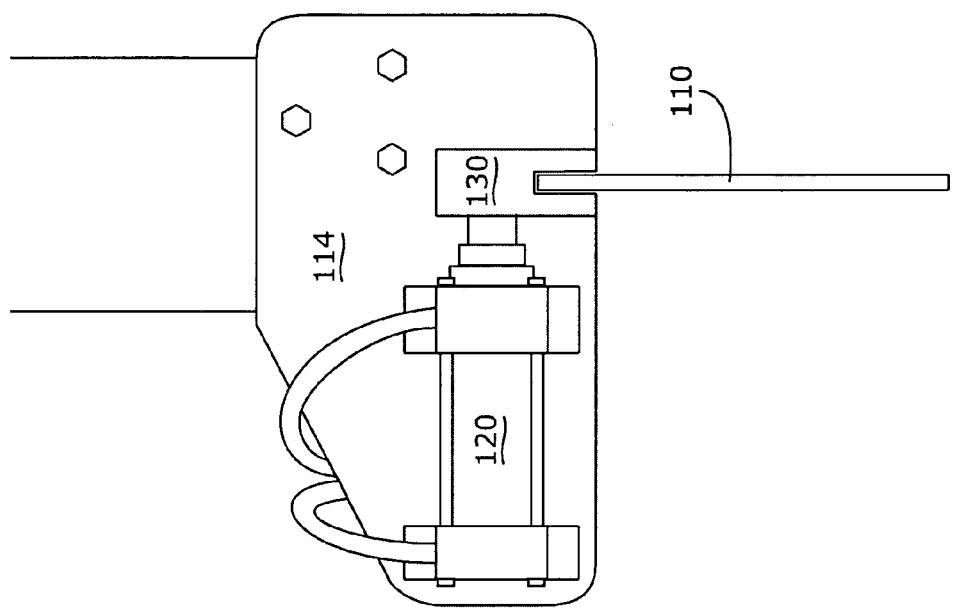

Referring now to FIGS. 2 and 3, there are shown perspective and front elevational views, respectively, of pusher mechanism 108 with stone-contacting pusher member 110 in a retracted position. Pusher assembly 108 has an attachment plate 114 that is attached to a saw guard 116 by bolts 118. It will be recognized that other mounting positions may be available depending upon the construction of the particular rotary-blade slab saw to which pusher mechanism 108 is attached. It will also be recognized that ways other than bolts 118 for attaching plate 114 to guard 116 exist. Consequently, the invention is not considered limited to the specific attachment point and/or attachment mechanism examples chosen for purposes of disclosure. Rather, any saw attachment point and/or attachment mechanism are intended to be included in the present invention.

Plate 114 supports a pneumatic cylinder 120 attached thereto by mounting blocks 122, 124. Mounting blocks 122, 124 may have slots, not shown, allowing side-to-side adjustment of the position of pneumatic cylinder 120 with respect to mounting plate 114. Mounting blocks 122, 124 are typically secured to mounting plate 114 by bolts 126.

A piston, not shown, housed within cylinder 120 is extended outwardly therefrom upon application of air pressure to pneumatic cylinder 120. An actuator 128 attached to the piston has a distal end that terminates in a support block 130 which, in turn, supports stone-contacting pusher member 110. When actuator 128 is in its extended position, stone-contacting pusher member 110 is exerted against a severed stone slab 106 thereby preventing slab 106 from tipping over into saw blade 104.

In operation, as saw blade 104 completes a cut of a stone slab 106, control signals, not shown, either from the saw's controller 136 (FIG. 4), or created by a dedicated controller 138 using sensor information from sensors 140a, . . . , 140n, actuate pneumatic cylinder 120 thereby extending actuator 128 and stone-contacting member 110. A timer, not shown, retracts actuator 128 after a full stroke, thereby preventing possible damage to cylinder 120, actuator 128 or stone-contacting member 110 which might occur if the actuator 128 remained extended.

Figure 4:
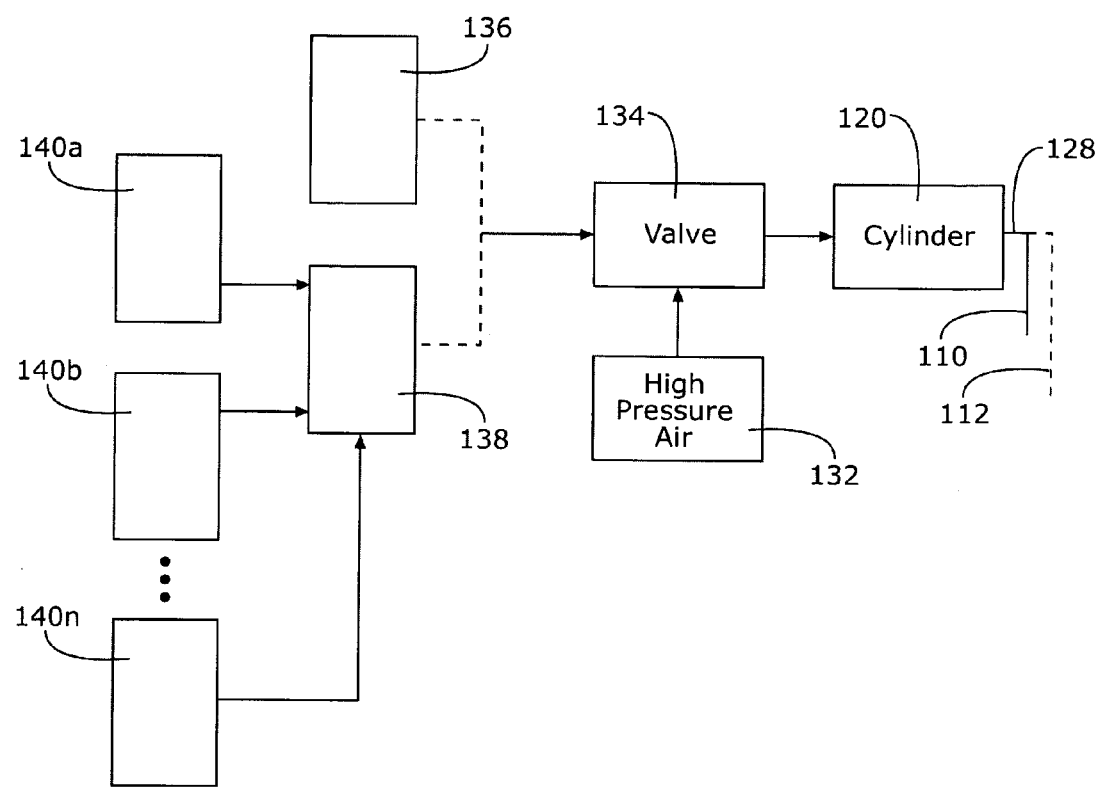
FIG. 4 is a schematic block diagram of the control system of the pushing mechanism of the invention.

Referring now to FIG. 4, there is shown a schematic block diagram of the control aspect of the pusher of the invention. Stone-contacting pusher member 110, connected to actuator 128 of pneumatic cylinder 120, is shown schematically in a retracted position 110 and an extended position 112. A source of high-pressure compressed air 132 is connected to an electrically-actuated solenoid valve 134. Solenoid valve 134 is operatively connected to one of two possible controllers 136 and 138. In a first embodiment, a modern slab saw is assumed to have all necessary control signals available from a controller 136 thereof. Necessary control signals may be provided by controller 136, typically by adding program code to the control program thereof.

However, in older saws, such a controller 136 may be absent and/or incapable of providing the required control signals. In these cases, a dedicated controller 138 is provided to actuate the inventive pusher mechanism 108 (FIGS. 2 and 3).

Because the market for slab saws is relatively small, at least compared to other mass-produced commodities, each saw provided by a particular manufacture may be slightly different. Consequently, each installation will be slightly different. In some cases, as mentioned hereinabove, all necessary control information required to actuate pusher 108 may be readily available. On older, purely mechanical saws, no control information may be available. Many saws may provide some but not all the required information. To solve this problem, a dedicated controller 138 may be provided. Controller 138 accepts inputs from sensors 140a, 140b, . . . , 140n as required. Sensor technology is well known to those of skill in the machine control arts and it will be recognized that numerous approaches to generating controller inputs may be utilized. Also, microprocessor-based machine control systems are also widely known. Consequently, any suitable controller and sensor package may be used to generate an actuation signal to pneumatic cylinder 120. The invention is not considered limited to any particular type of sensor, sensor location, or controller but includes and any all suitable sensors and controllers.

Since other modifications and changes varied to fit particular operating requirements and environments will be apparent to those skilled in the art, the invention is not considered limited to the examples chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A pusher mechanism disposed proximate the blade of a rotary-blade stone saw, comprising:
   a) a stone-contacting pusher member adapted for movement in a direction perpendicular to a saw blade and between a first, predetermined position and a second, predetermined position, said pusher mechanism being adapted for attachment to at least one of: a saw guard, and a carriage of a rotary-blade, stone saw;
   b) means for imparting linear motion to said pusher member operatively attached thereto; and
   c) a controller operatively attached to said means for imparting linear motion, for selectively causing movement of said pusher member from said first predetermined position to said second predetermined position.

2. The pusher mechanism disposed proximate the blade of a rotary-blade stone saw as recited in claim 1, wherein said means for imparting motion comprises a pneumatic cylinder.

3. The pusher mechanism disposed proximate the blade of a rotary-blade stone saw as recited in claim 1, wherein said controller comprises means to move said pusher between said second, predetermined position and said first, predetermined position.

4. The pusher mechanism disposed proximate the blade of a rotary-blade stone saw as recited in claim 1, wherein said controller comprises at least a portion of an internal controller forming a part of a saw to which said pusher mechanism is attached.

5. The pusher mechanism disposed proximate the blade of a rotary-blade stone saw as recited in claim 1, wherein said controller is a stand-alone controller.

6. The pusher mechanism disposed proximate the blade of a rotary-blade stone saw as recited in claim 5, further comprising:
  d) at least one sensor adapted and configured to monitor a parameter of a saw to which said pusher mechanism is attached, said at least one sensor being operatively connected to said controller.

7. A method for sawing a stone block into slabs, the steps comprising:
  a) providing a rotary-blade stone saw adapted for sawing stone blocks into slabs;
  b) attaching a pushing mechanism comprising a stone-contacting pusher member adapted for movement in a direction perpendicular to a saw blade and between a first, predetermined position and a second, predetermined position, means for imparting motion to said pusher member operatively attached thereto, and a controller operatively attached to said means for imparting motion, for selectively causing movement of said pusher member from said first predetermined position to said second predetermined position;
  c) cutting a stone slab from a block of stone using said rotary-blade stone saw; and
  d) at a predetermined time during said cutting step (c), actuating said pusher mechanism to prevent said stone slab, when severed from said stone block, contacting said saw blade.

8. The method for sawing a stone block into slabs as recited in claim 7, wherein said means for imparting motion comprises a pneumatic cylinder.

9. The method for sawing a stone block into slabs as recited in claim 7, wherein said controller comprises means to move said pusher between said second, predetermined position and said first, predetermined position.

10. The method for sawing a stone block into slabs as recited in claim 7, wherein said controller comprises an internal controller forming a part of a saw to which said pusher mechanism is attached.

11. The method for sawing a stone block into slabs as recited in claim 7, wherein said controller is a stand-alone controller.

12. The method for sawing a stone block into slabs as recited in claim 7, wherein said pusher mechanism further comprises at least one sensor adapted and configured to monitor a parameter of a saw to which said pusher mechanism is attached, said at least one sensor being operatively connected to said controller.

13. A pusher mechanism disposed proximate the blade of a rotary-blade, stone saw, comprising:
  a) a stone-contacting pusher member adapted for movement in a direction perpendicular to the plane of a saw blade and between a first, predetermined position and a second, predetermined position;
  b) means for imparting linear motion to said pusher member operatively attached thereto;
  c) a controller operatively attached to said means for imparting linear motion, for selectively causing movement of said pusher member from said first, predetermined position to said second, predetermined position, and
  d) at least one sensor adapted and configured to monitor a parameter of a saw to which said pusher mechanism is attached, said at least one sensor being operatively connected to said controller.

14. The pusher mechanism disposed proximate the blade of a rotary-blade, stone saw as recited in claim 13, wherein said means for imparting linear motion comprises a pneumatic cylinder.

15. The pusher mechanism disposed proximate the blade of a rotary-blade, stone saw as recited in claim 13, wherein said controller comprises means to move said pusher member between said second, predetermined position and said first, predetermined position.

16. The pusher mechanism disposed proximate the blade of a rotary-blade, stone saw as recited in claim 13, wherein said pusher mechanism is adapted for attachment to at least one of: a saw guard, and a carriage of a rotary-blade, stone saw.

17. The pusher mechanism disposed proximate the blade of a rotary-blade, stone saw as recited in claim 13, wherein said controller comprises at least a portion of an internal controller forming a part of a saw to which said pusher mechanism is attached.

18. The pusher mechanism disposed proximate the blade of a rotary-blade, stone saw as recited in claim 13, wherein said controller is a stand-alone controller.

* * * * *